(12) United States Patent
Xiong et al.

(10) Patent No.: US 8,518,253 B2
(45) Date of Patent: Aug. 27, 2013

(54) ION-EXCHANGE DEVICE AND REGENERATION METHOD OF ION-EXCHANGE MATERIAL THEREOF

(75) Inventors: Rihua Xiong, Shanghai (CN); Wei Cai, Shanghai (CN); Liping Zheng, Shanghai (CN); Hai Yang, Shanghai (CN); Su Lu, Shanghai (CN); Zhigang Deng, Shanghai (CN); Lin Chen, Shanghai (CN)

(73) Assignee: General Electric Company, Niskayuna, NY (US)

( * ) Notice: Subject to any disclaimer, the term of this patent is extended or adjusted under 35 U.S.C. 154(b) by 1000 days.

(21) Appl. No.: 12/336,792

(22) Filed: Dec. 17, 2008

(65) Prior Publication Data

US 2010/0147704 A1    Jun. 17, 2010

(51) Int. Cl.
*B01D 61/00* (2006.01)
*C02F 1/42* (2006.01)
*B01J 49/00* (2006.01)
*B01D 61/46* (2006.01)
*C02F 1/46* (2006.01)

(52) U.S. Cl.
USPC ...... 210/269; 204/290.11; 204/537; 204/631; 205/759; 210/670

(58) Field of Classification Search
USPC ............ 204/290.11, 537, 538, 631; 205/759; 210/269, 670
See application file for complete search history.

(56) References Cited

U.S. PATENT DOCUMENTS

| | | | | |
|---|---|---|---|---|
| 2,812,300 A | * | 11/1957 | Pearson | ............... 210/670 |
| 4,032,452 A | | 6/1977 | Davis | |
| 4,562,113 A | * | 12/1985 | Yonahara et al. | ............. 204/280 |
| 4,585,536 A | * | 4/1986 | Puetter et al. | ................ 204/539 |
| 4,888,098 A | * | 12/1989 | Nyberg et al. | ............... 204/418 |
| 5,423,965 A | | 6/1995 | Kunz | |
| 5,584,981 A | | 12/1996 | Turner et al. | |

(Continued)

FOREIGN PATENT DOCUMENTS

| | | | |
|---|---|---|---|
| EP | 1925596 A1 | * | 5/2008 |
| GB | 1220456 A | | 1/1971 |

(Continued)

OTHER PUBLICATIONS

W. Lei. "Study of aminated polypyrrole-coated granules for humic acid and bovine serum albumin adsorption." Thesis: National University of Singapore. 2005 (no month). <http://scholarbank.nus.edu.sg/handle/10635/14947>.*

*Primary Examiner* — Keith Hendricks
*Assistant Examiner* — Steven A. Friday
(74) *Attorney, Agent, or Firm* — Mary Louise Stanford (57) ABSTRACT

An electrochemical device comprises an electrochemical cell. The electrochemical cell comprises a composite cation-exchange member including a conductive base and a cation-exchange material in physical contact with the conductive base, a composite anion-exchange member including a conductive base and an anion-exchange material in physical contact with the conductive base; and a compartment between the composite cation-exchange and anion-exchange members. The compartment comprises an inlet for introducing a feed stream, and an outlet for exiting of an output stream out of the compartment. The electrochemical device comprises a control device configured to transmit an electrical current to the composite cation-exchange and anion-exchange members at a regeneration stage in a manner that the conductive base on the composite cation-exchange member loses electrons and the conductive base on the composite anion-exchange member gains electrons.

20 Claims, 7 Drawing Sheets

(56) References Cited

U.S. PATENT DOCUMENTS

| | | | |
|---|---|---|---|
| 5,620,597 A * | 4/1997 | Andelman | 204/645 |
| 5,788,825 A | 8/1998 | Park et al. | |
| 5,954,937 A | 9/1999 | Farmer | |
| 6,402,916 B1 | 6/2002 | Sampson et al. | |
| 6,416,645 B1 | 7/2002 | Sampson et al. | |
| 2004/0174657 A1 * | 9/2004 | Andelman et al. | 361/503 |
| 2005/0103634 A1 | 5/2005 | Andelman et al. | |
| 2005/0220989 A1 * | 10/2005 | Chaturvedi et al. | 429/232 |
| 2006/0091013 A1 * | 5/2006 | Takahashi et al. | 204/632 |
| 2009/0045048 A1 * | 2/2009 | Bourcier et al. | 204/228.1 |

FOREIGN PATENT DOCUMENTS

| | | |
|---|---|---|
| WO | WO 2006132336 A1 * | 12/2006 |
| WO | WO2007070594 A2 | 6/2007 |
| WO | WO2008016671 A2 | 2/2008 |
| WO | WO2008140556 A2 | 11/2008 |

* cited by examiner

ION-EXCHANGE DEVICE AND REGENERATION METHOD OF ION-EXCHANGE MATERIAL THEREOF

BACKGROUND

Embodiments of the invention generally relate to the ion exchange technology, and more particularly, to an ion-exchange device utilizing ion-exchange materials and a regeneration method of the ion exchange materials.

Ion exchange materials are used to remove or replace dissolved solids, ions or other charged species in solutions, for example, for producing high purity water, for deionization of waste water, or for water softening. Ion exchange materials typically comprises two types, namely cation-exchange and anion-exchange material, both types generally being solids or gels which comprise replaceable ions, or which chemically react with specific ions in the solution.

When the ion exchange materials are saturated with ions extracted from the source solution, the ion exchange materials can not perform ion exchanging any more, or results in a low efficiency of ion exchanging. Accordingly, ion exchange materials need to be regenerated to remove the extracted ions from the ion exchange materials. One convention regeneration method of ion exchange materials is a chemical method which has a rinsing step using acidic solutions or concentrated salt solution (e.g saturated sodium chloride solution) for cation-exchange material and basic solutions for anion-exchange material to replace the extracted ions. However, in order to have a complete regeneration of the ion exchange materials, the acidic solutions and basic solutions usually include excessive ions, which result in a waste acid or a waste base, which is considered to be hazardous waste and requires additional treatment before discharge to the environment. Another conventional regeneration method of ion exchange materials is an electrochemical method which splits water into H+ and OH− under DC current and then regenerating the ion exchange materials by the H+ and OH−. Similar to that discussed with respect to the chemical method, in order to have a complete regeneration of the ion exchange materials, the produced H+ and OH− are generally excessive, and result in a waste acid or a waste base. In addition, the electrolysis or water splitting process consumes a considerably large electricity due to the low efficiency of electrochemical water splitting.

In a word, the conventional ion exchange resin regeneration methods are not efficient and costly. It may be desirable to have an ion exchange device and a regeneration method that differs from those conventional assemblies and methods.

BRIEF DESCRIPTION

One aspect of the invention discloses an electrochemical device. The electrochemical device comprises an electrochemical cell. The electrochemical cell comprises a composite cation-exchange member including a conductive base and a cation-exchange material in physical contact with the conductive base, a composite anion-exchange member including a conductive base and an anion-exchange material in physical contact with the conductive base; and a compartment between the composite cation-exchange and anion-exchange members. The compartment comprises an inlet for introducing a feed stream, and an outlet for exiting of an output stream out of the compartment. The electrochemical device comprises a control device configured to transmit an electrical current to the composite cation-exchange and anion-exchange members at a regeneration stage in a manner that the conductive base on the composite cation-exchange member loses electrons and the conductive base on the composite anion-exchange member gains electrons.

Another aspect of the invention discloses an electrochemical assembly. The electrochemical assembly comprises a casing, and a plurality of composite ion-exchange members arranged in parallel in the casing. The plurality of composite ion-exchange members defines a plurality of compartments between every two adjacent composite ion-exchange members, and comprises at least one bipolar composite member between two compartments. The bipoar member comprises at least one conductive base, a cation-exchange material on one side, and an anion-exchange material on the other side. The electrochemical assembly further comprises a control device configured to transmit a current at a regeneration stage in a manner that the conductive base on the cation-exchange side of the bipolar composite member loses electrons and the conductive base on the anion-exchange side of the bipolar composite member gains electrons.

Still another aspect of the invention discloses a regeneration method of an ion exchange material which is positively or negatively charged and have adsorbed negative or positive species. The regeneration method comprises bonding the ion-exchange material to a high-surface-area conductive base, and exerting an electrical current to the high-surface-area conductive base to drive electrons to flow to or from the high-surface-area conductive base to expel adsorbed species from the ion-exchange material into a solution.

Still another aspect of the invention discloses an electrochemical process. The electrochemical process comprises a deionization stage and a regeneration stage. The deionization stage comprises introducing a feed stream into a compartment, adsorbing dissolved cations or anions on an ion-exchange material, and exiting a dilute stream out of the compartment. The regeneration stage comprises physically contacting the ion-exchange material to a conductive base, and exerting an electrical current to a conductive base, and causing the conductive base to lose electrons to expel anions adsorbed on the ion-exchange material, or causing the conductive base to gain electrons to expel cations adsorbed on the ion exchange material.

DRAWINGS

In the accompanying drawings like characters represent like parts throughout the drawings, wherein.

DETAILED DESCRIPTION

The invention includes embodiments that relate to an electrochemical device and an electrochemical device utilizing ion exchange materials. The invention includes embodiments that relates to a regeneration method for ion exchange materials.

Figure 1:
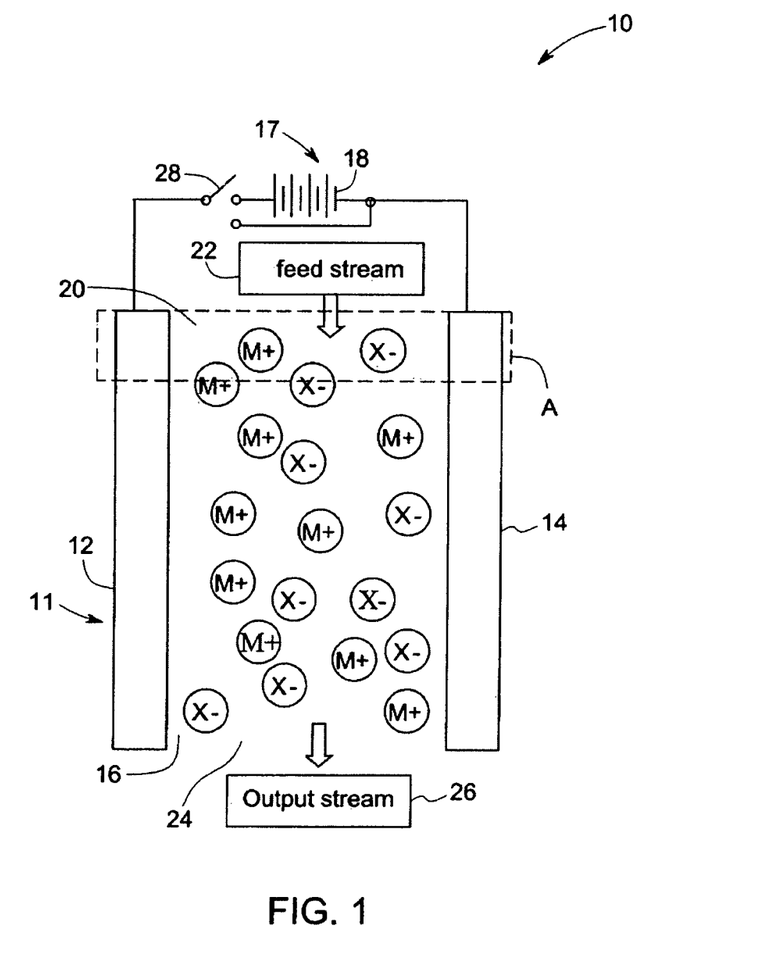
FIG. 1 illustrates an electrochemical device according to one embodiment of the invention.

Referring to FIG. 1, an electrochemical device 10 according to one embodiment of the invention comprises an electrochemical cell 11. The electrochemical cell 11 comprises a composite cation-exchange member 12, a composite anion-exchange member 14, and a compartment 16 between the composite cation-exchange and anion-exchange members 12 and 14. The electrochemical device 10 comprises a control device 17 comprising a power source 18 operable to transmit current to the composite cation-exchange and anion-exchange members 12 and 14. In one embodiment, the compartment 16 includes an inlet 20 for introducing a feed stream 22 containing ion species into the compartment 16, and an outlet 24 for exiting an output stream 26 out of the compartment 16. In certain embodiments, the output stream 26 is a dilute stream at a deionization stage and is a concentrated solution at a regeneration stage, which will be discussed in detail later. In certain embodiments, the control device 17 further comprises a switch or relay 28 which is, in one embodiment, a bidirectional switch for controlling connection and disconnection of the composite cation-exchange and anion-exchange members 12 and 14 with the power source 18.

In one embodiment, the composite cation-exchange and anion-exchange members 12 and 14 are planar. In another embodiment, the composite cation-exchange and anion-exchange members 12 and 14 are cylindrical. At the regeneration stage, the composite cation-exchange and anion-exchange members 12 and 14 respectively electrically couple to a positive terminal and a negative terminal of the power source 18. At the deionization stage, the bidirectional switch 28 disconnects the power source 18 with the composite cation-exchange and anion-exchange members 12 and 14 and causes a short circuit between the composite cation-exchange and anion-exchange members 12 and 14. In other embodiment, the deionization rate is further controlled by controlling the current between the cation exchange member 12 and the anion-exchange member 14 with a resistor or other electrical methods.

Figure 2:
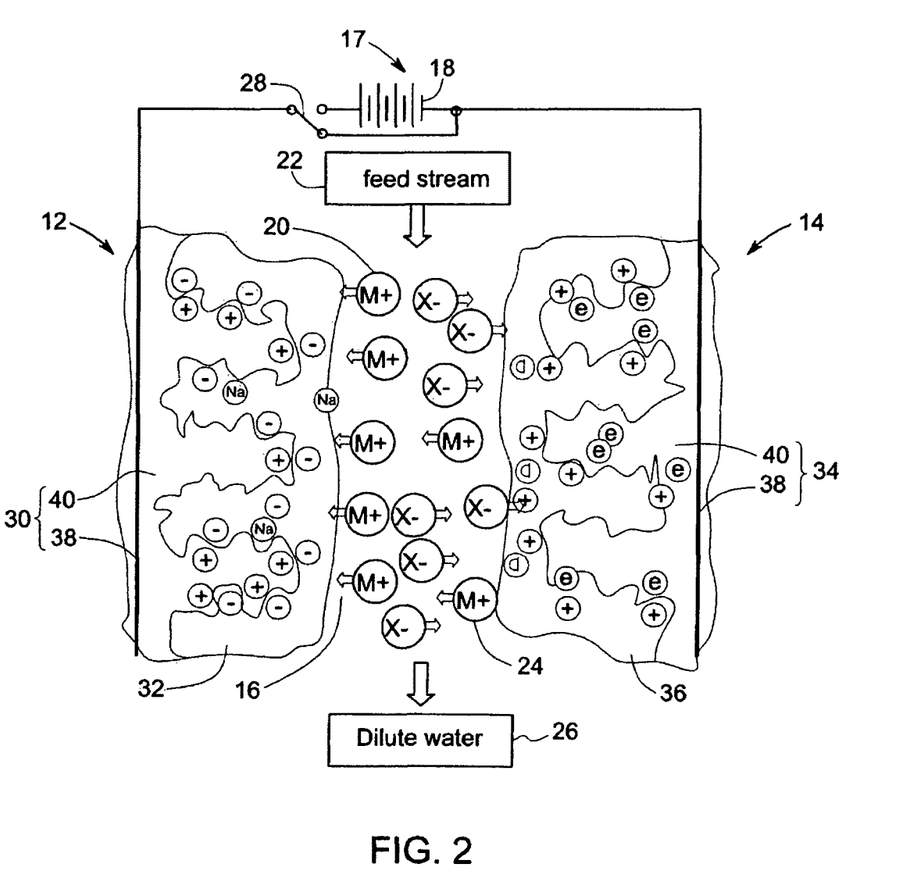
FIG. 2 illustrates an enlarged view of a portion A of the electrochemical device in FIG. 1 at a deionization stage according to one embodiment of the invention.
Figure 3:
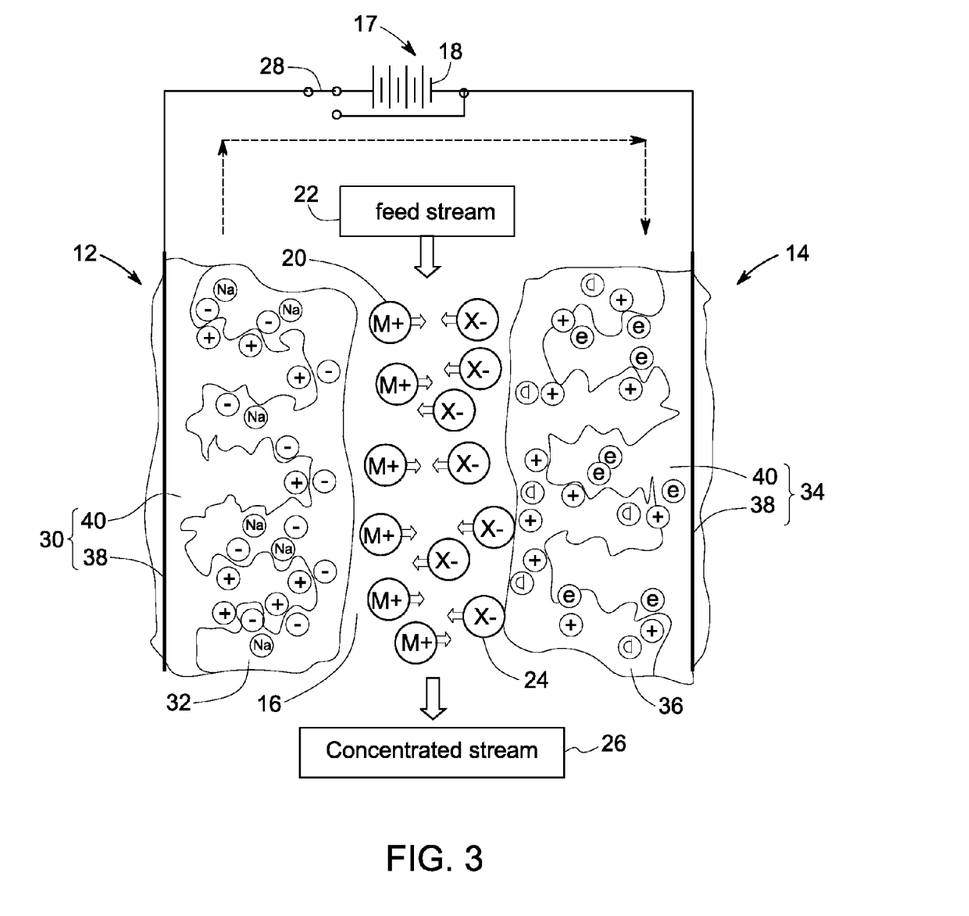
FIG. 3 illustrates the enlarged view of the portion A of the electrochemical device in FIG. 1 at a regeneration stage according to one embodiment of the invention.

FIGS. 2 and 3 are respectively enlarged views of a portion A of the electrochemical device 10 in FIG. 1 for better illustration of the composite cation-exchange and anion-exchange members 12 and 14 respectively at the deionization stage and the regeneration stage, according to one embodiment of the invention. The exemplary composite cation-exchange member 12 includes a conductive base 30 operable connected to a positive terminal of the power source 18 and a cation-exchange material 32 physically contacts with the conductive base 30. In certain embodiments, the exemplary composite anion-exchange member 14 includes a conductive base 34 operable connected to a negative terminal of the power source 18 and an anion-exchange material 36 physically contacted with the conductive base 34.

In certain embodiments, each of the conductive bases 30 and 34 has a high surface area, and in one embodiment, is a porous electrode. In certain embodiments, the high-surface-area electrodes 30 and 34 each comprise a conductive substrate 38, and a conductive high-surface-area portion 40 on the conductive substrate 38. The conductive substrate 38 may be formed of any suitable metallic structure, such as, for example, a plate, a mesh, a foil, or a sheet. Furthermore, the conductive substrate 38 may be formed of suitable conductive materials, such as, for example, stainless steel, graphite, titanium, platinum, iridium, rhodium, or conductive polymer conductive oxides or conductive polymer/carbon composite.

In addition, the metals may be uncoated or coated. One such example is a platinum coated stainless steel mesh. In certain embodiments, one or more conducting polymers may be employed as the conductive substrate 38. Non-limiting examples of such conducting polymers may include polyaniline, polypyrrole, polythiophene, and combinations thereof. Examples of conductive oxides may comprise indium-doped tin oxide (ITO), antimony-doped tin oxide (ATO), and aluminium-doped zinc oxide. In one embodiment, the conductive substrate 38 is a titanium mesh. In other embodiments, the substrate 38 is a stainless steel mesh, a polyolefin/graphite composite film, a graphite plate, or a titanium plate. In one embodiment, the conductive high surface area portion 40 may be formed of any conductive materials or composites with a high surface area. Examples of such materials for the conductive high-surface-area portion 40 include active carbon, carbon nanotubes, graphite, carbon fiber, carbon cloth, carbon aerogel, metallic powders, for example nickel, metal oxides, for example ruthenium oxide, conductive polymers, and any mixtures of any of the above.

In another embodiment, which is not shown in the drawings, the conductive bases 30, 34 comprises, for example, nano-patterned or nano-structured conductive material and includes micro protrusions to form the conductive high-surface-area portions 40. In one embodiment, the conductive bases 30, 34 comprise patterned arrays of carbon nanowires or nanotubes (CNTs). The patterned array of CNTs is made due to the fact that the chemical bonding of nanotubes is composed entirely of sp2 bonds, providing the molecules with their unique strength. Nanotubes naturally align themselves into rope-like formats held together by Van der Waals forces. In another embodiment, e.g. under high pressure, nanotubes tend to merge together and exchange some $sp^2$ bonds for $sp^3$ bonds, thus giving the possibility of producing strong, unlimited-length wires. In one embodiment, the nanotubes grow on a conductive substrate 38. In another embodiment, the nanotubes grow in a pattern which can work without additional conductive substrate.

In certain embodiments, the cation-exchange and anion-exchange materials 32, 36 are solids, powders, fibers, gels containing ions which will adsorb, or which will react with ionic species in the feed stream, so as to de-ionize the feed stream 22 into a dilute stream 26 at a deionization stage. In certain embodiments, the cation and anion-exchange materials respectively have an ion exchange capacity of at least 0.1 mequiv/g. More preferably it has an ion exchange capacity of higher than 0.5 mequiv/g.

In one embodiment, the cation-exchange materials 32 comprise at least one of a weakly acidic cation-exchange material and a strongly acidic cation-exchange material. The weakly acidic cation exchange material is the inorganic or organic materials comprising weakly acidic functionality. Examples of weak acidic functionality comprise carboxylic functionality, borate functionality or phosphoric functionality. Strongly acidic cation exchange material is the inorganic or organic materials comprising strongly acidic functionality. Examples of strongly acidic group comprise sulfonic functionality or sulphate functionality. In one embodiment, two or more ion exchange materials may be combined, for example, as a combination of a weakly acidic cation-exchange material and a strongly acidic cation-exchange material, a combination of an inorganic cation-exchange material and an organic cation-exchange material.

In one embodiment, the anion-exchange material 36 comprises at least one of a weakly basic anion-exchange material and a strongly basic anion-exchange material. The weakly basic anion exchange material is the inorganic or organic material containing weakly basic functionality. Examples of weakly basic functionality comprise primary, secondary, tertiary amine functionality and imidazolium, guanidinium or pyridinium functionality. The strongly basic anion exchange material is the inorganic or organic material containing strongly basic functionality. Examples of strongly basic functionality comprise quaternary ammonium functionality. In certain embodiments, one or more conducting polymers may be employed as the anion exchange material. Non-limiting examples of such conducting polymers may include polyaniline, polypyrrole, polythiophene, and combinations thereof.

In one embodiment, a method of producing the composite cation-exchange and anion-exchange members 12, 14 comprises producing a high-surface-area electrode 30, 34. A method of producing the high-surface-area electrodes are described and illustrated in U.S. Pat. Application Pub. No. 2008/0057398 and pending application Ser. No. 11/947,328 both to the common assignee herewith, the entire disclosures of which are incorporated herein by reference. In certain embodiments, the finished high-surface-area electrodes 30 and 34 respectively include a plurality of pores. In one embodiment, the surface area of the high-surface-area portion 38 may be in a range of about 100 $m^2/g$ to about 5000 $m^2/g$ as measured by nitrogen adsorption BET method. In a specific embodiment, the surface are of the high-surface-area portion 38 is in a range of about 750 $m^2/g$ to about 3000 $m^2/g$. In a more specific embodiment, the surface are of the high-surface-area portion 38 is in a range of about 1500 $m^2/g$ to about 2500 $m^2/g$. In one embodiment, an average diameter of the pores is greater than 1 nanometer.

The method of forming a composite cation-exchange or anion exchange members 12 and 14 comprises forming a cation-exchange or anion-exchange material 32 on/in the formed high-surface-area electrode 30 and 34 to be physically contact with the high-surface-area portions 40. In one embodiment, the method includes forming a mixture of an ion exchange monomer, a cross-linker and a proper initiator, and dispersing the mixture on/in the high-surface-area portions 40 by, for example, casting, dipping, spray coating, screen printing, or spin coating. Examples of anion exchange monomer include 2-(Dimethylamino)ethyl methacrylate, 4-Vinylbenzyl trimethylammonium chloride and all other quaternary/tertiary amino group containing monomers. Examples of cation exchange monomer include 2-Acrylamido-2-methylpropanesulfonic acid, 4-Styrenesulfonic acid sodium salt and all other sulfonic or carboxyl group containing monomers. Examples of cross-linker include N,N-methylenebisacrylamide, ethylene glycol dimethacrylate and all other mono-functional or multifunctional dibond group containing chemicals. Examples of the initiator include azobisisobutyronitrile, benzoyl peroxide and all other azo or peroxide chemicals.

In one embodiment, a contact interface of the cation-exchange or anion exchange materials 32 and 36 with the high-surface-area portions 40 is greater than 10 percent of the surface area of the high-surface-area portions 40. In one specific embodiment, a contact interface of the cation-exchange or anion exchange materials 32 and 36 with the high-surface-area portions 40 is greater than 40 percent of the surface area of the high-surface-area portions 40. In a more specific embodiment, a contact interface of the cation-exchange or anion exchange materials 32 and 36 with the high-surface-area portions 40 is greater than 70 percent of the surface area of the high-surface-area portions 40.

Referring to FIG. 2, at a deionization stage, the bidirectional switch 28 disconnects the power source 18 with the composite cation-exchange and anion-exchange members 12 and 14, and the circuit between the composite cation-exchange and anion-exchange members 12 and 14 is shorted. Cations M+ ionized in the feed stream 22 are adsorbed on the cation-exchange material 32 and anions X− ionized in the feed stream 22 are adsorbed on the anion-exchange materials 36, thereby de-ionizing the feed stream 22 to produce a dilute stream 26 exiting the compartment 16 through the outlet 24.

Referring to FIG. 3, at a regeneration stage, the bidirectional switch 28 connects the power source 18 with the composite cation-exchange and anion-exchange members 12 and 14 and respectively charges the composite cation-exchange and anion-exchange members 12 and 14 as the positive and negative electrodes. Under the electrical current, the conductive base 34 of the composite cation exchange member 12 loses electrons, and the electrons transmits in a direction as indicated by the arrow of the phantom line to the conductive base 34 of the composite anion-exchange member 14. Accordingly, anions X− adsorbed on the anion-exchanges materials 36 are expelled to the solution in the compartment 16, and the cations M+ adsorbed on the cation-exchange materials 32 are expelled into the solution in the compartment 16. The output stream 26 at the regeneration stage is a concentrated solution with a relatively high concentration of ions.

In one embodiment, the power source 18 is controlled that a differential voltage between the composite cation-exchange and anion-exchange members 12 and 14 is between 0 to 10V. In one specific embodiment, the differential voltage between the composite cation-exchange and anion-exchange members 12 and 14 is between 0 to 5V In one more specific embodiment, the differential voltage between the composite cation-exchange and anion-exchange members 12 and 14 is between 0 to 2V.

In one embodiment, when the bidirectional switch 28 disconnects the power source 18 with the composite cation-exchange and anion-exchange members 12 and 14, and shorts the circuit between the composite cation-exchange and anion-exchange members 12 and 14, the electrochemical device 10 returns back to the deionization stage. A current caused by the differential voltage flows from the composite cation-exchange member 12 to the composite anion-exchange member 14, electrons flow from the composite anion-exchange member 14 to the composite cation-exchange member 12. Accordingly, more positively charged groups on composite anion-exchange member 14 is released to adsorb anion species in the feed stream 22, and more negatively charged groups on the composite cation-exchange member 12 are released to adsorb cations.

Figure 4:
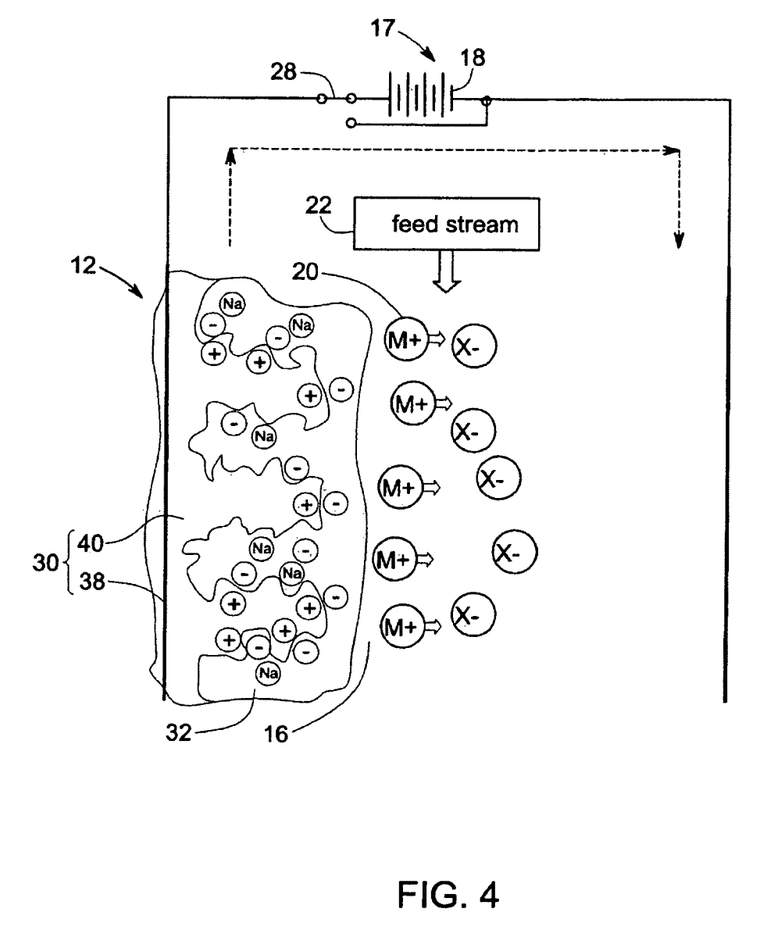
FIG. 4 illustrates an exemplary configuration for regeneration of a cation-exchange material.

The regeneration method discussed above is not limited to be used with both composite cation-exchange and ion-exchange members 12 and 14 as working pair or pairs. In one embodiment, a regeneration method of a separate cation-exchange or anion-exchange material comprises bonding the ion exchange material to be physically contact with a high-surface-area conductive base, and transmitting a power energy to the high-surface-area conductive base to drive electrons to transmit from or to the high-surface-area conductive base to expel adsorbed ions from the cation-exchange or anion-exchange material into a solution. FIG. 4 illustrates an exemplary configuration for regeneration of a cation-exchange material 32. The cation-exchange material 32 is bonded to a high-surface-area portion 40 of a conductive base 30. During regeneration of the cation-exchange material 32, a power source 18 transmits a current to the conductive base 30 and pull electrons from the conductive base. Accordingly, cations M+ adsorbed on the cation-exchange material 32 are expelled into the solution.

Figure 5:
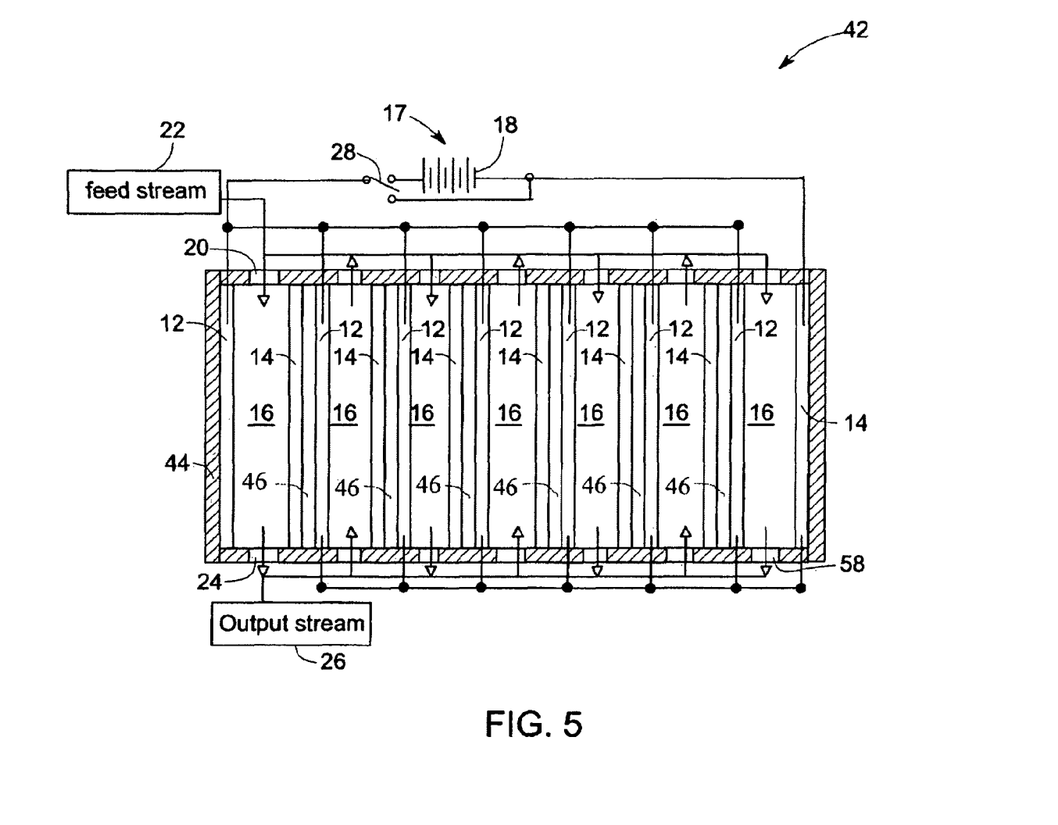
FIG. 5 illustrates an electrochemical device according to one embodiment of the invention.

Referring to FIG. 5, an electrochemical device 42 according to another embodiment of the invention comprises a casing 44, a plurality of electrochemical cells 11 each comprising a composite cation-exchange and an anion-exchange member 12 and 14 and a compartment 16 therebetween, and a control device 17. In the illustrated embodiment, the cation-exchange members 12 of different cells 11 are connected in parallel, and the anion-exchange members 14 of different cells 11 are connected in parallel. The control device 17 comprises a power source operable to transmit a current to each cell 11 and thus cation-exchange members 12 having a higher potential than the corresponding anion-exchange members 14 at the regeneration stage. In the illustrated embodiment, the electrochemical device 42 further comprises a plurality of insulative film 46 each between two adjacent cells 11.

Figure 6:
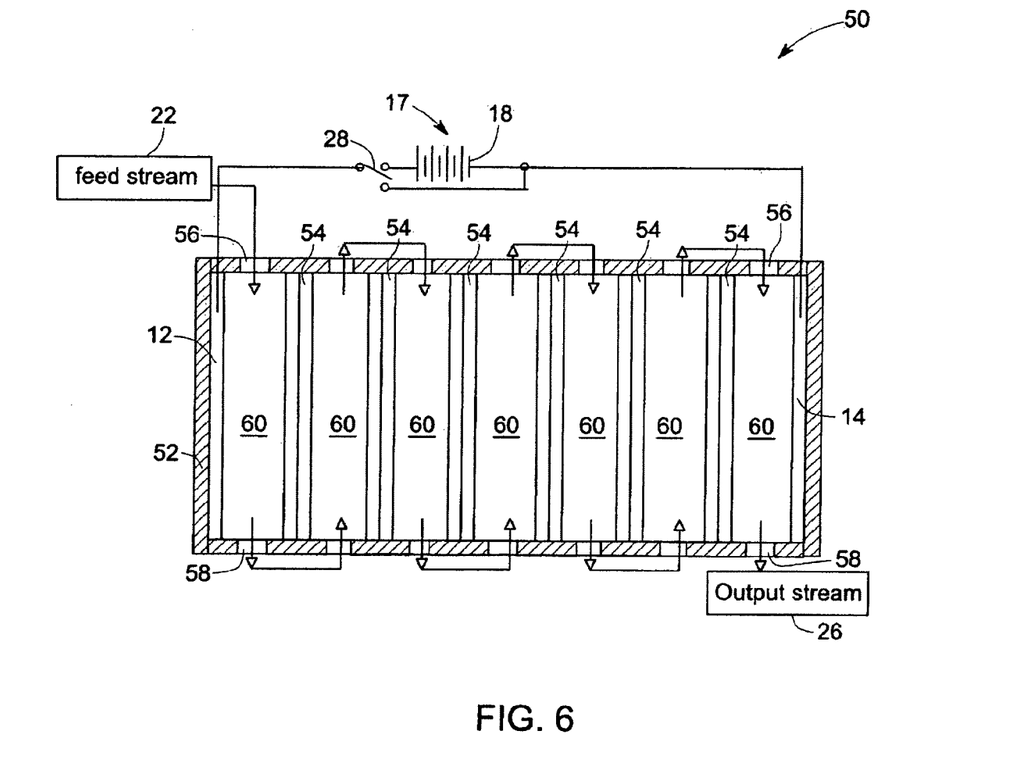
FIG. 6 illustrates an electrochemical device according to another embodiment of the invention.

FIG. 6 illustrates an electrochemical device 50 according to still another embodiment of the invention. The electrochemical device 50 includes a stack of composite ion-exchange members 12, 14 and 54 supported in a casing 52, a plurality of compartments 60 defined between every two adjacent composite ion-exchange members 12, 14 and 54, and a power source 18. Each composite ion-exchange member 12, 14 and 54 is planar and is arranged substantially parallel to one another. The opposite outermost ion exchange members, which are nearest to the casing side, are respectively composite cation-exchange and anion-exchange members 12 and 14 which are similar to those described in the electrochemical device 10. The composite cation-exchange and anion-exchange members 12 and 14 are respectively operably connected to positive and negative terminals of the power source 18.

Figure 7:
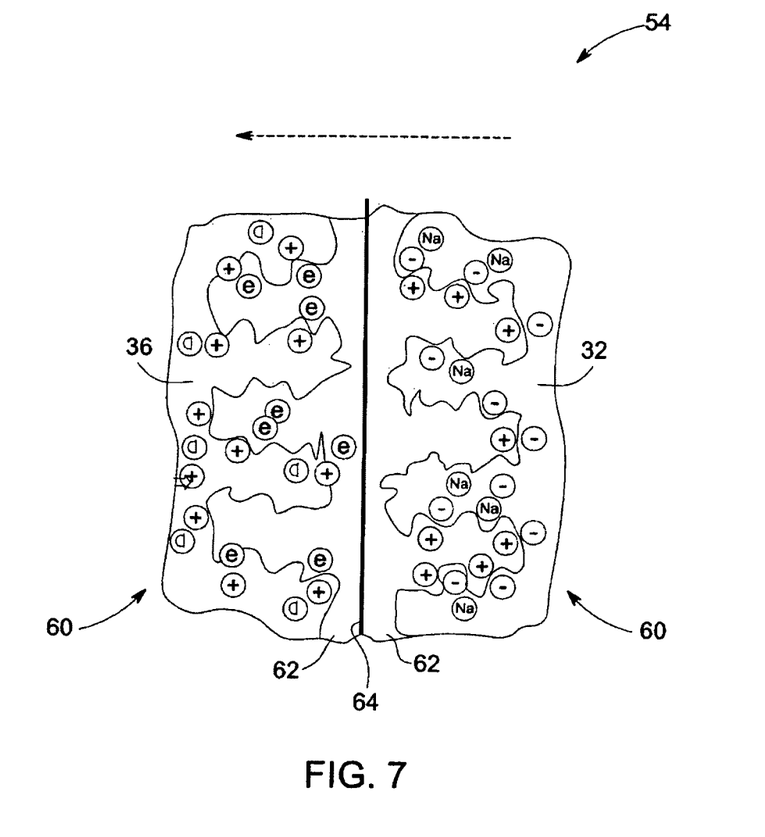
FIG. 7 illustrates an enlarged view of a bipolar composite member according to one embodiment of the invention.

Referring to FIG. 7, in one embodiment, each composite ion-exchange member 54 between two compartments is a bipolar composite member. The bipolar composite member 54 includes at least one conductive high-surface-area base 62, and cation-exchange and anion-exchange materials 32 and 36 respectively on opposite sides of the at least one conductive high-surface-area base 62. The cation-exchange materials 32 are adjacent to a compartment 60 relatively close to the composite anion-exchange member 14, and the anion-exchange materials 36 are adjacent to a compartment 60 relatively close to the composite cation-exchange member 12. In one embodiment, the bipolar composite member 54 further comprises a conductive and ion-impermeable member 64 between or within the conductive high-surface-area base 62. "Ion-impermeable" here actually means "permeable to neither ions nor water". In one embodiment, the conductive and ion-impermeable member 64 comprises a composite film of polyolefin and graphite. In one embodiment, the bipolar composite member 54 is a composite component to have one conductive and ion-impermeable member 64 tightly sandwiched between cation-exchange and anion-exchange members. In an alternative embodiment, the bipolar composite member 54 is integrally made.

In the illustrated embodiment, the casing 52 includes a plurality of inlets 56 and a plurality of outlets 58. In one embodiment, only one of the inlets 56 introduces a feed stream 22 to one of the compartments 60, and the compartments 60 are interconnected in a manner that the outlet 58 of one compartment 60 communicates the inlet 56 of another compartment 60 in series, so that the feed stream 22 passes over each compartment 60. Only one of the outlets 58 exiting the output stream 26 which is a dilute stream at the deionization stage and a concentrated solution at a regeneration stage. Accordingly, the feed stream 22 can have a very clean deionization through the plurality of compartments 60, which can be, in one embodiment, used to produce high purity water. In an alternative embodiment, the casing 52 includes a plurality of inlets 56 for simultaneously introducing feed streams 22 respectively into corresponding compartments 60 in parallel, and a plurality of outlets 58 for exiting of output streams 26 which is a dilute stream at the deionization stage and a concentrated solution at a regeneration stage. In another embodiment, the electrochemical system 50 can be configured in a combination way of the above described parallel and series mode. Accordingly, the electrochemical system 50 has a high deionization efficiency.

Referring to FIGS. 6 and 7, at a deionization stage of the electrochemical system 50, one or more feed streams 22 flow through the compartments 60, the cation-exchange materials 32 adsorb cations M+ in the solution, and anion-exchange materials 36 adsorb anions X− in the solution. The feed stream 22 is de-ionized and exiting the compartments as a dilute stream 26.

At a regeneration stage, the switch 28 controls the power source 18 to transmit a current to the outmost composite cation-exchange and anion-exchange members 12 and 14 with the composite cation-exchange member 12 as a cathode and the composite anion-exchange member 14 as an anode. As discussed with reference to FIG. 2, under the electrical current, the composite cation-exchange member 12 loses electrons and the composite anion-exchange member 14 gains electrons. Accordingly, cations M+ adsorbed on the composite cation-exchange member 12 and anions X− adsorbed on the composite anion-exchange member 14 are expelled into the solution. At the same time, the conductive high-surface-area base 62 at the side of cation exchange material 32 loses electrons while the conductive high-surface-area base 62 at the side of anion exchange material 36 gains electrons. By this kind of charge re-distribution under electrical field, cations and anions in the bipolar composite member 54 are expelled into the solution. Accordingly, both cation-exchange and anion-exchange materials 32 and 36 of each composite bipolar member 54 are regenerated. At the deionization stage, the conductive high-surface-area base 62 is recovered from the charge re-distribution built in regeneration stage, with electron transmitting from anion exchange side to cation exchange side. By this means, the positively charged groups in anion exchange material 36 and negatively charged groups in cation exchange material 32 are released to adsorb anions and cations, respectively.

The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term.

The embodiments described herein are examples of articles, systems and methods having elements corresponding to the elements of the invention recited in the claims. This written description enables those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An electrochemical device, comprising:
   an electrochemical cell comprising:
      a composite cation-exchange member comprising a first conductive base and a cation-exchange material in physical contact with the first conductive base;
      a composite anion-exchange member comprising a second conductive base and an anion-exchange material in physical contact with the second conductive base; and
      a compartment between the composite cation-exchange and anion-exchange members, the compartment comprising an inlet for introducing a feed stream, and an outlet for exiting of an output stream out of the compartment; and
   a control device configured to:
      transmit an electrical current through the composite cation-exchange and anion-exchange members at a regeneration stage in a manner that the first conductive base loses electrons and the second conductive base gains electrons; and
      discharge the electrical current through the first and second conductive bases at a deionization stage, and cause cations in the feed stream to adsorb on the cation-exchange material and anions in the feed stream to adsorb on the anion-exchange materials,
   wherein, each of the first and second conductive bases comprises a conductive substrate and a conductive high-surface-area portion which has a surface area of 100 to 5000 $m^2/g$ as measured by nitrogen adsorption BET method;
   the cation-exchange material is coated on the conductive high-surface-area portion of the first conductive base and the anion-exchange material is coated on the conductive high-surface-area portion of the second conductive base; and
   a contact interface of the cation-exchange or anion-exchange materials with the conductive high-surface-area portions is greater than 70 percent of the surface area of the conductive high-surface-area portions.

2. The electrochemical device of claim 1, wherein the cation-exchange material comprises a weakly acidic cation exchange material, a strongly acidic cation exchange material or combination thereof.

3. The electrochemical device of claim 1, wherein the anion-exchange material comprises a weakly basic anion exchange material, a strongly basic anion exchange material or combination thereof.

4. The electrochemical device of claim 1, wherein the anion-exchange material comprises conducting polymers including polyaniline, polypyrrole, polythiophene, or any combination thereof.

5. The electrochemical device of claim 1, wherein the conductive substrate comprises any of or any combination of stainless steel, graphite, titanium, platinum, iridium, rhodium, conducting oxides, conductive polymer, and carbon composite.

6. The electrochemical device of claim 1, wherein the conductive high-surface-area portion comprises any of or any combination of carbon, carbon nanotubes, graphite, carbon fiber, carbon cloth, carbon aerogel, active carbon, metallic powders, and metal oxides.

7. The electrochemical device of claim 1, wherein the conductive high-surface-area portions comprises a plurality of pores, and wherein an average diameter of the pores is greater than 1 nanometer.

8. The electrochemical device of claim 1, wherein each of the conductive bases comprises nano-patterned or nano-structured conductive material and comprises micro protrusions to form high-surface-area portions.

9. The electrochemical device of claim 1, wherein the current transmitted to the composite cation-exchange and anion-exchange members is controlled that a differential voltage between the composite cation-exchange and anion-exchange members is between 0 to 10V at the regeneration stage.

10. The electrochemical device of claim 1 further comprising a casing for supporting the electrochemical cell.

11. The electrochemical device of claim 10 further comprising at least two electrochemical cells each defining a compartment within the casing.

12. The electrochemical device of claim 11 further comprising at least one spacer between adjacent two electrochemical cells.

13. The electrochemical device of claim 1, wherein the control device is operable to discharge the composite cation-exchange and anion-exchange members at a deionization stage by short circuiting the composite cation-exchange and anion-exchange members.

14. An electrochemical assembly, comprising:
   a casing comprising at least one inlet for introducing a feed stream to be de-ionized and at least one outlet for exiting of a dilute stream during a deionization stage;
   a plurality of composite ion-exchange members arranged in parallel in the casing, and defining a plurality of compartments between every two adjacent composite ion-exchange members, each of the composite ion-exchange members comprising a conductive base having a conductive substrate and a conductive high-surface-area portion which has a surface area of 100 to 5000 $m^2/g$ as measured by nitrogen adsorption BET method, and an ion-exchange material coated on the conductive high-surface-area portion of the conductive base, a contact interface of the ion-exchange material with the conductive high-surface-area portion greater than 70 percent of the surface area of the conductive high-surface-area portion, the plurality of composite ion-exchange members comprising at least one bipolar composite member between two compartments, the bipolar member comprising at least one conductive base, a cation-exchange material on one side, and an anion-exchange material on the other side; and
   a control device configured to transmit a current at a regeneration stage in a manner that the conductive base on the cation-exchange side of the bipolar composite member loses electrons and the conductive base on the anion-exchange side of the bipolar composite member gains electrons, wherein the control device is operable to disconnect the conductive bases from a power source.

15. The electrochemical device of claim 14, wherein the bipolar composite member comprises a conductive and ion-impermeable film between the cation and anion-exchange materials.

16. The electrochemical device of claim 15, wherein the conductive and ion-impermeable film comprises a composite film of polyolefin and graphite.

17. The electrochemical device of claim 14, wherein the plurality of composite ion-exchange members comprises one composite cation-exchange member connected to a positive terminal of the power source at the regeneration stage, and an composite anion-exchange member connected to a negative terminal of a power source at the regeneration stage.

18. The electrochemical device of claim 17, wherein the anion-exchange material of the bipolar composite member is closer to the composite cation-exchange member than to the composite anion-exchange member, and the cation-exchange material of the bipolar composite member is closer to the composite anion-exchange member than to the composite cation-exchange member.

19. An electrochemical process comprising:
  a deionization stage comprising:
    introducing a feed stream into a compartment, between a composite cation-exchange member comprising a first conductive base and a cation-exchange material in physical contact with the first conductive base, and a composite anion-exchange member comprising a second conductive base and an anion-exchange material in physical contact with the second conductive base, wherein the first and second conductive bases comprise a conductive substrate and a conductive high-surface-area portion which has a surface area of 100 to 5000 $m^2/g$ as measured by nitrogen adsorption BET method, the cation-exchange material is coated on the conductive high-surface-area portion of the first conductive base and the anion-exchange material is coated on the conductive high-surface-area portion of the second conductive base, and a contact interface of the cation-exchange anion-exchange materials with the conductive high-surface-area portions is greater than 70 percent of the surface area of the conductive high-surface-area portions;
    adsorbing dissolved cations and anions in the feed stream on the cation-exchange material and anion-exchange material, respectively, wherein the first and second conductive bases are electrically disconnected from a power source; and
    exiting a dilute stream out of the compartment; and
  a regeneration stage comprising:
    applying an electrical current to the first and second conductive bases, and causing the first conductive base to lose electrons to expel cations adsorbed on the cation-exchange material and the second conductive base to gain electrons to expel anions adsorbed on the anion-exchange material.

20. The electrochemical process of claim 19, wherein the deionization stage and regeneration stage repeated periodically and alternately.

\* \* \* \* \*